(12) United States Patent
Matsuura Frontini

(10) Patent No.: US 11,208,170 B2
(45) Date of Patent: Dec. 28, 2021

(54) MODULAR ELECTRIC BICYCLE

(71) Applicant: Matteo Giuseppe Matsuura Frontini, Milan (IT)

(72) Inventor: Matteo Giuseppe Matsuura Frontini, Milan (IT)

(*) Notice: Subject to any disclaimer, the term of this patent is extended or adjusted under 35 U.S.C. 154(b) by 221 days.

(21) Appl. No.: 16/603,156

(22) PCT Filed: Apr. 3, 2018

(86) PCT No.: PCT/EP2018/058411
§ 371 (c)(1),
(2) Date: Oct. 4, 2019

(87) PCT Pub. No.: WO2018/185062
PCT Pub. Date: Oct. 11, 2018

(65) Prior Publication Data
US 2020/0031416 A1     Jan. 30, 2020

Related U.S. Application Data

(60) Provisional application No. 62/577,596, filed on Oct. 26, 2017, provisional application No. 62/481,143, filed on Apr. 4, 2017.

(51) Int. Cl.
*B62K 3/06*     (2006.01)
*B60L 50/60*     (2019.01)
(Continued)

(52) U.S. Cl.
CPC ............... *B62K 3/06* (2013.01); *B60L 50/66* (2019.02); *B62K 19/40* (2013.01); *B62M 6/90* (2013.01);
(Continued)

(58) Field of Classification Search
CPC .......... B62K 3/06; B62K 19/40; B62K 19/30; B60L 50/66; B60L 2200/12; B60L 50/20; B60L 50/64; B62M 6/90; Y02T 10/70
See application file for complete search history.

(56) References Cited

U.S. PATENT DOCUMENTS 8,651,212 B2 * 2/2014 Vincenz ................. B62H 5/001
                                                        180/205.1
9,611,003 B1 * 4/2017 Yu ............................. B62M 6/90
(Continued)

FOREIGN PATENT DOCUMENTS

CN        203 473 119 U     3/2014
DE    10 2008 047087 A1     3/2010
(Continued)

OTHER PUBLICATIONS

PCT/EP2018/058411 International Search Report and Written opinion, dated Jul. 13, 2018, 9 pp. total.
(Continued)

*Primary Examiner* — Jacob D Knutson
*Assistant Examiner* — Marlon A Arce
(74) *Attorney, Agent, or Firm* — Daniel C. Pierron; Widerman Malek, PL

(57) ABSTRACT

A modular electric bicycle with the classic diamond frame design which has been designed to accommodate a d-c rechargeable battery pack within its top, down and seat tube and conceal all electrical wiring inside the frame. The modular electric bicycle has been designed in order to ease the maintenance of electronic components and replace obsolete electronics just as easily as conventional bicycles can have mechanical components replaced.

4 Claims, 9 Drawing Sheets

(51) Int. Cl.
  *B62K 19/40*  (2006.01)
  *B62M 6/90*   (2010.01)
  *B62K 19/30*   (2006.01)
  *B60L 50/20*   (2019.01)

(52) U.S. Cl.
  CPC .......... *B60L 50/20* (2019.02); *B60L 2200/12* (2013.01); *B62K 19/30* (2013.01); *Y02T 10/70* (2013.01)

(56) References Cited

U.S. PATENT DOCUMENTS

| | | | |
|---|---|---|---|
| 9,902,457 B2 * | 2/2018 | Hu | H01M 50/20 |
| 2016/0311494 A1 * | 10/2016 | Schliewert | B62K 19/30 |
| 2018/0251188 A1 * | 9/2018 | Durdevic | B62J 99/00 |
| 2019/0308686 A1 * | 10/2019 | Hendey | B62K 11/02 |
| 2019/0337587 A1 * | 11/2019 | den Hertog | B62M 6/90 |
| 2020/0062325 A1 * | 2/2020 | Talavasek | B62M 6/55 |
| 2021/0016850 A1 * | 1/2021 | Bass | B62J 6/04 |
| 2021/0147028 A1 * | 5/2021 | Wang | B62J 43/10 |

FOREIGN PATENT DOCUMENTS

| | | |
|---|---|---|
| DE | 10 2010 032720 A1 | 1/2012 |
| DE | 10 2012 106229 A1 | 1/2014 |
| DE | 10 2015 007111 A1 | 11/2016 |

OTHER PUBLICATIONS

PCT/EP2018/058411 International Preliminary Report on Patentability, dated Jun. 25, 2019, 13 pp. total.

\* cited by examiner

56

MODULAR ELECTRIC BICYCLE

CROSS REFERENCE TO RELATED APPLICATIONS

This application is the U.S. National Stage of International Patent Application No. PCT/EP2018/058411 filed on Apr. 3, 2018 and which claims priority thereto, which is incorporated herein by reference in its entirety, and which further claims the benefit of U.S. Application No. 62/481,143 filed on Apr. 4, 2017 and which claims priority thereto, which is incorporated herein by reference in its entirety, and which further claims the benefit of U.S. Application No. 62/577,596 filed on Oct. 26, 2017 and which claims priority thereto, which is incorporated herein by reference in its entirety.

FIELD OF INVENTION

The present invention relates to a modular electric bicycle which has a frame designed to fit a battery pack and electronic wiring inside it, and perishable electronic components designed to be fitted outside the bicycle frame preferably underneath and/or within the saddle. This modular design allows for quick and easy replacement of obsolete electronic components and reduces battery waste generated throughout the lifecycle of the product.

BACKGROUND

Generally electric bicycles are fitted with an electric motor with power rating between 200 W and 1000 W, a battery pack with voltage ranging from 24V to 48V, an electric motor controller, electronic sensors, commands and other electrical devices such as displays, lights and sound emitting devices.

An Electronically Power Assisted Cycles (EPAC) is a type of electric bicycle defined by the European Union as: a cycle equipped with pedals and an auxiliary electric motor, which cannot be propelled exclusively by means of this auxiliary electric motor.

Electric bicycles have different level of design sophistication. The simplest electric bicycles are conventional bicycles which have been converted to electric by replacing and adding components to it. These simple electric bicycles have electric components, wiring and battery pack fitted onto the existing conventional bicycle frame by various means. They can also be provided as conversion kits which convert a regular bike to an electric bike. These modifications to the original bicycle can lead to negative effects of weight distribution, safety and aesthetics.

More sophisticated electric bicycles have been designed as such and have frame designs which fit battery packs and electronic components inside them. These electric bicycles have improved aesthetics and weight distributions however have not been designed to replace perishable electronic components, upgrade technology and ease technical maintenance. If electronic components on these electric bicycles need to be replaced or upgraded they cannot be changed easily. Currently there is no electric bicycle which has been designed to easily replace electronic components which may be made obsolete by new technologies, malfunction, damaged or customized by user. Conventional bicycles are designed to be easily repaired, upgraded and can last for a person's lifetime if it is properly maintained. There is no electric bicycle available which has adopted this philosophy in its design.

It is the object of the present invention, to create a modular electric bicycle that can be easily maintained, upgraded and can last the user for a long period of time compared to conventional electric bicycles. It is also the object of the present invention to create a modular electric bicycle which has the visual design of a conventional bicycle.

According to the present invention, the above object is solved with an electric bicycle frame according to claim 1, an electrical bicycle battery pack according to claim 6, an electronic components according to claim 8 and electronic components compartment according to claim 10.

BRIEF SUMMARY

An electric bicycle frame having a down tube, a seat tube, a top tube, a head tube; wherein at least one of the head tube and seat tube is modified with holes that are adapted to allow fitting of a battery pack to the inside of at least one of the top tube and down tube when all tubes are joined. When the holes are provided in the head tube at a position corresponding to the down tube, the battery pack can be inserted from the front side of the bicycle frame through the holes into the down tube. When the holes are provided in the head tube at a position corresponding to the top tube, the battery pack can be inserted from the front side of the bicycle frame through the holes into the top tube. It is, however, also possible to provide holes in the seat tube at a position corresponding to the top tube such that the battery pack can be inserted into the top tube from the rear side of the bicycle. Further, the battery pack can be inserted into the seat tube from the top side thereof.

This configuration allows to insert battery packs into all of the three tubes, namely the top tube, the down tube and the seat tube thus achieving a high capacity of electric energy by using space in all of the tubes of the bicycle frame.

Preferably, outer contours of the holes correspond to intersections between a virtual extension of the inner cylindrical surface of the top tube with wall portions of the head tube and/or the seat tube, and/or outer contours of the holes correspond to intersections between a virtual extension of the inner cylindrical surface of the down tube with wall portions of the head tube. By means of this feature, battery packs having an outer diameter corresponding to the inner diameter of the tubes can be inserted into the bicycle frame. This maximizes the use of available space inside the tubes for storing the battery packs.

Preferably, the electric bicycle frame may further comprise an electrical wiring system inside the bicycle frame, wherein the electrical wiring system is adapted to be connected to the battery pack as well as to electronic components. This allows to provide a modular system between the bicycle frame with its electrical wiring system, the battery packs as well as the electronic components. When one of the battery packs and the electronic components has reached its lifespan, it can be replaced by disconnecting it from the electric wiring system without the need of replacing other components. Also, when there is a new electric component with further features available, the electric component can be replaced by the new component without the need to replace the entire electric system or without the need to replace the entire bicycle frame.

Preferably, the electric wiring system comprises electrical connector parts adapted to connect the electrical wiring system to electrical connectors counter parts of the battery pack and the electronic components. This allows the user to easily replace the battery pack and/or the electric component by simply disconnecting the component to be replaced and connecting the new one.

Preferably, the electrical connectors are waterproof quick connectors. The use of quick connectors further improves the easiness when replacing a battery pack and/or an electric component.

The invention further relates to an electric bicycle battery pack adapted to be fitted inside at least one of the down tube, seat tube and top tube via the holes of the above-mentioned bicycle frame.

Preferably, the electrical bicycle battery pack further comprises an electrical connector counterpart adapted to be connectable to the electrical connector part of the above-mentioned electrical wiring system. This allows the user to easily replace the battery pack by simply disconnecting the component to be replaced and connecting the new one.

The invention also relates to an electronic component comprising an electrical connector counterpart adapted to be connectable to the electrical connector part of the above-mentioned electrical wiring system. This allows the user to easily replace the electric component by simply disconnecting the component to be replaced and connecting the new one.

Preferably, the electronic component is an electric motor, an electric motor controller, bicycle lights or a sensor.

The invention also relates to an electronic components compartment which is adapted to fit underneath the bicycle saddle and comprises the above-mentioned electric motor controller.

The invention further relates to a modular electric bicycle comprising the above-mentioned electric bicycle frame, the above-mentioned battery pack and the above-mentioned electronic components, which allows the battery pack and the electronic components to be replaced by the user.

Preferably, in the electric bicycle frame, the head tube and/or the seat tube has a thicker wall in the region of the extrusion as the reinforcement.

Preferably, the battery pack is a d-c rechargeable battery pack constructed and arranged triangularly in order to fit inside the top tube, the down tube and the seat tube of the electric bicycle frame.

DETAILED DESCRIPTION

Figure 1:
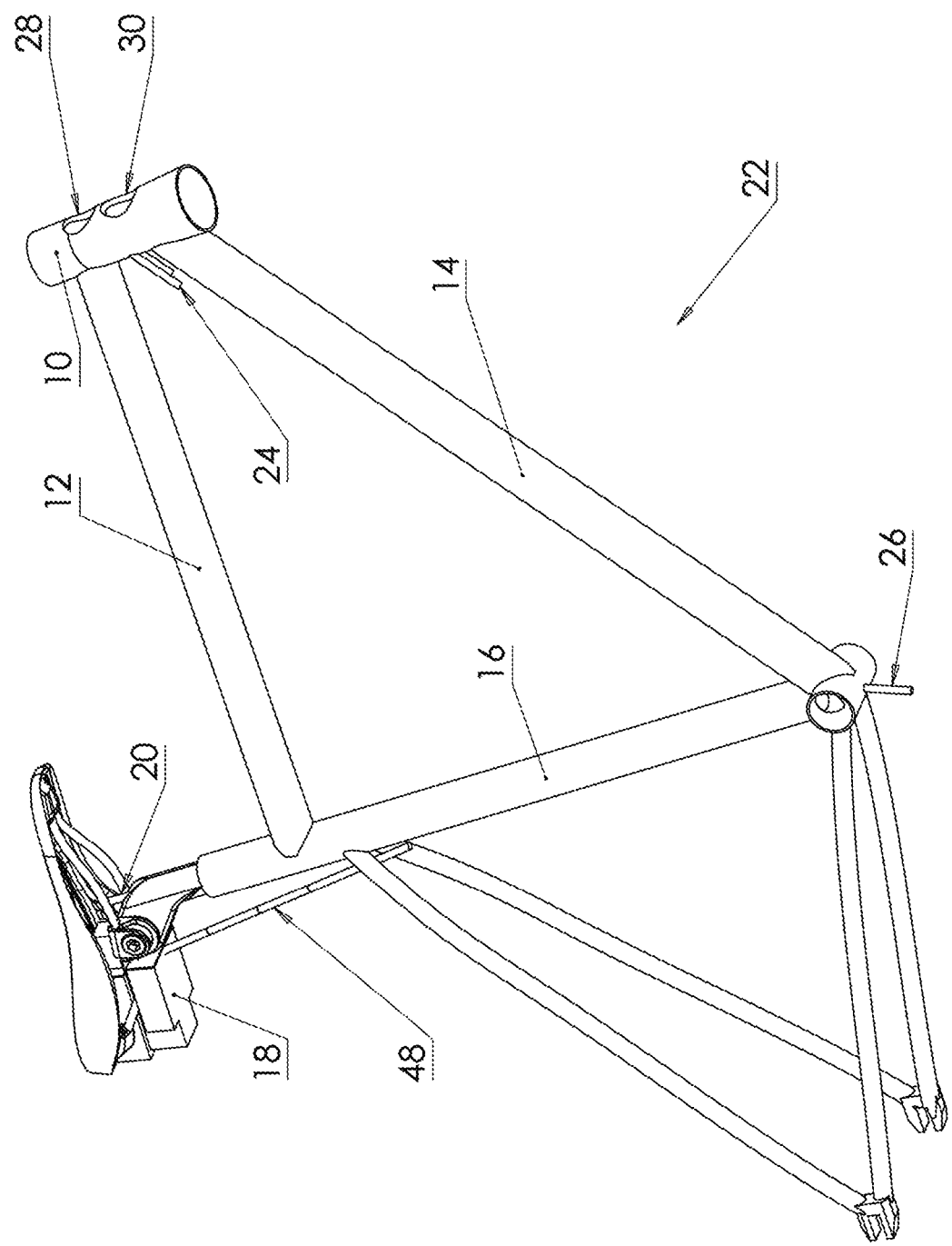
FIG. 1 shows a perspective view of an electric bicycle frame according to an embodiment of the invention.

The present embodiment refers to an electric bicycle frame (52), battery pack (62) mounted inside the frame, electronic component control box (18), electrical wiring system inside the frame (64) and the use of quick release waterproof connectors at the extremities of electrical wiring exiting the frame (20 24 26 48) which connect to the various electronic components on the electric bicycle. Although the embodiment is described with the frame being equipped with the battery pack and the electric components, the invention refers to a modular system in which the bicycle frame with the wiring system can be obtained separate from the battery pack and the electric components and re then assembled.

The different modules of the electric bicycle are divided as: the bicycle frame system module which contains the wiring and the battery pack, the control box system module (18) which receives, processes and transmits signals, the electric motor system module and the different sensors/controls systems modules on the electric bicycle. The control box system module, the electric motor system and the sensors/control systems modules refer to the electric components in sense of the claims.

Figure 3:
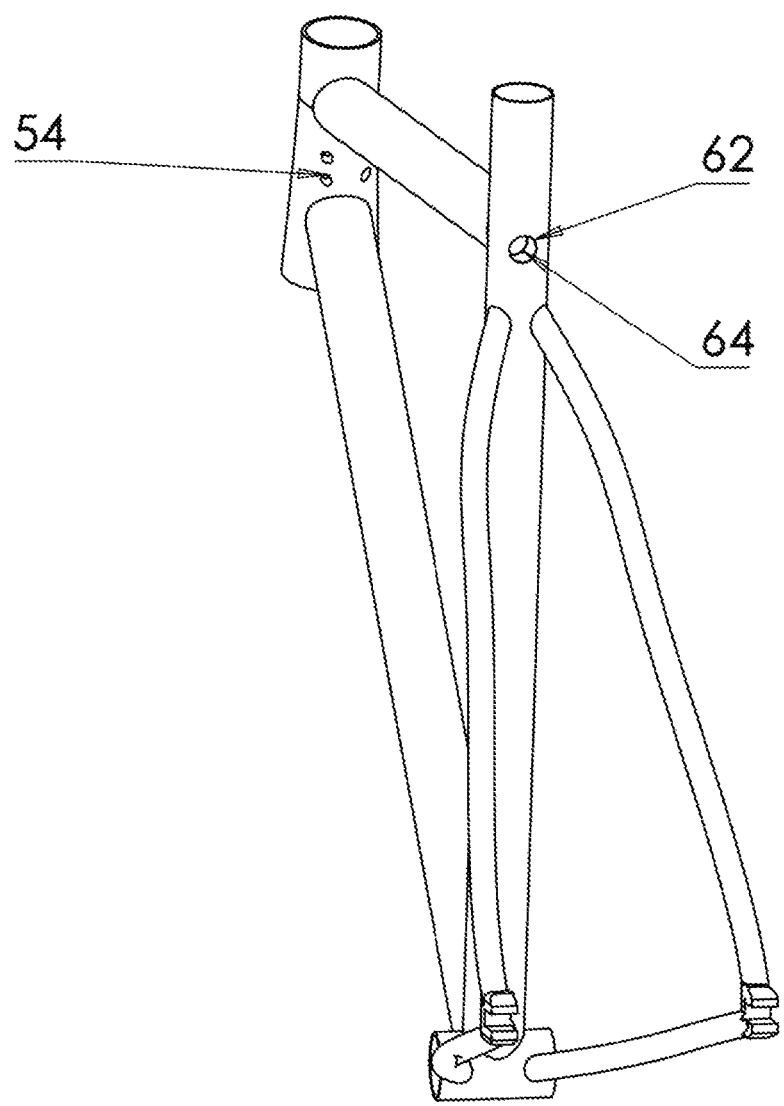
FIG. 3 shows a perspective rear left view of the electric bicycle frame of FIG. 1.
Figure 4:
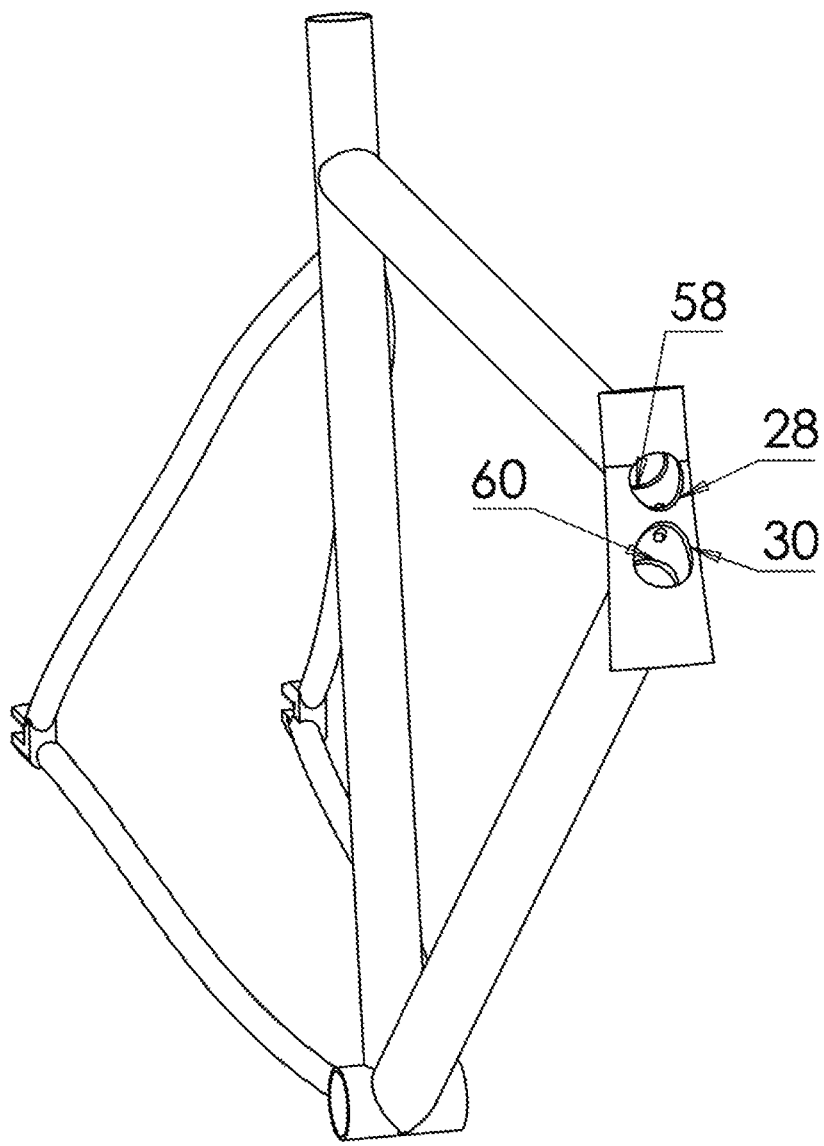
FIG. 4 shows a perspective front view of the electric bicycle frame of FIG. 1.
Figure 5:
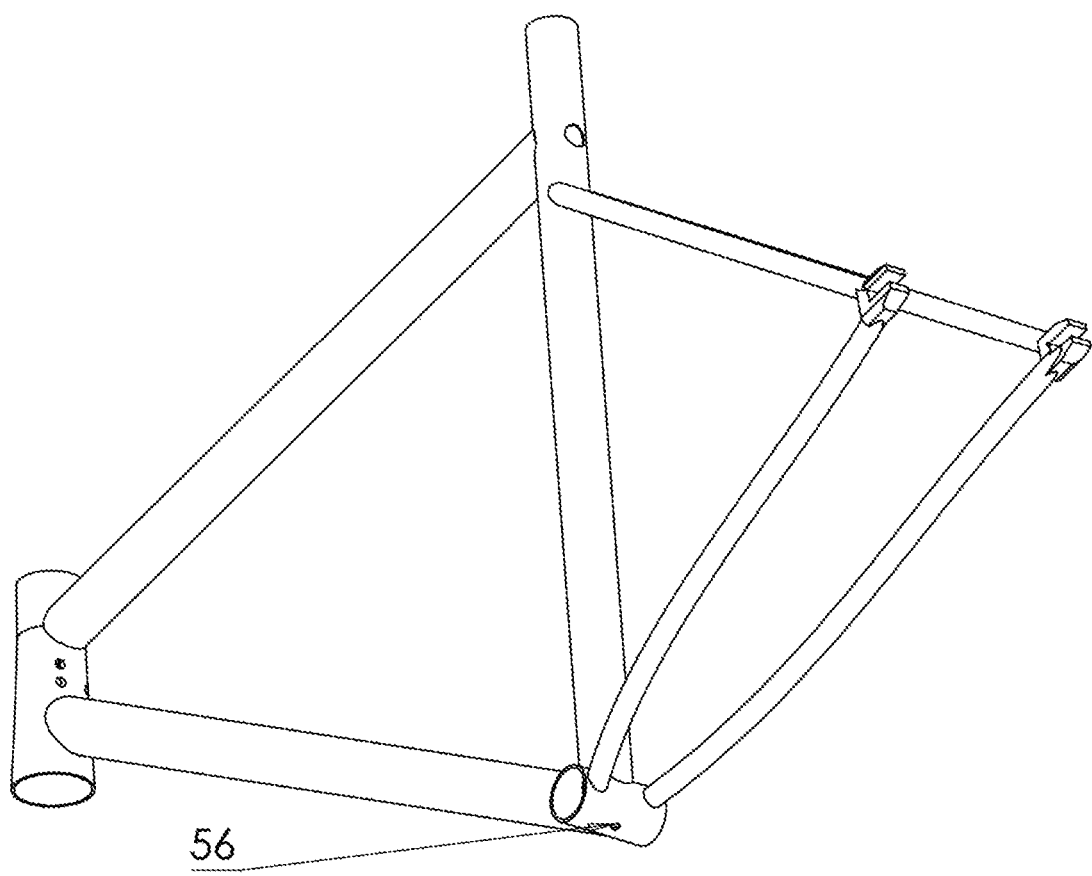
FIG. 5 shows a perspective bottom view of the electric bicycle frame of FIG. 1.
Figure 6:
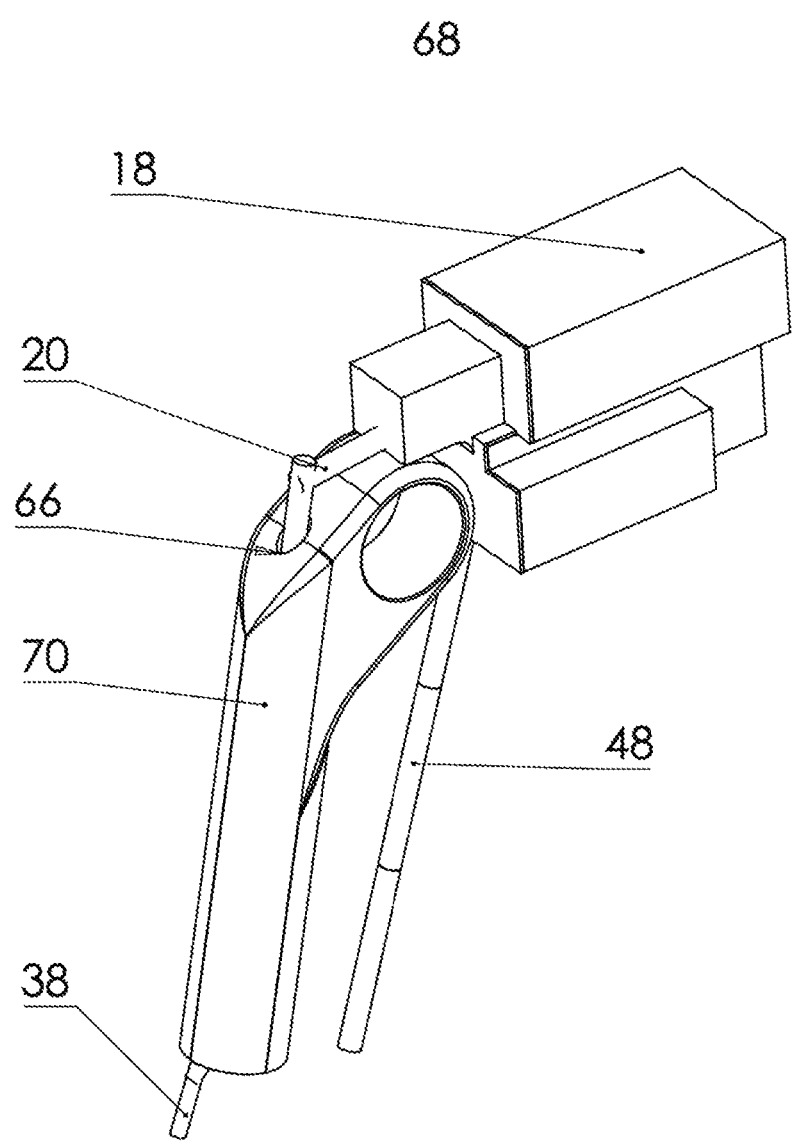
FIG. 6 shows a perspective top view of a seat post, a perishable electronic components compartment and electronic wiring connected to the perishable electronic components compartment.
Figure 7:
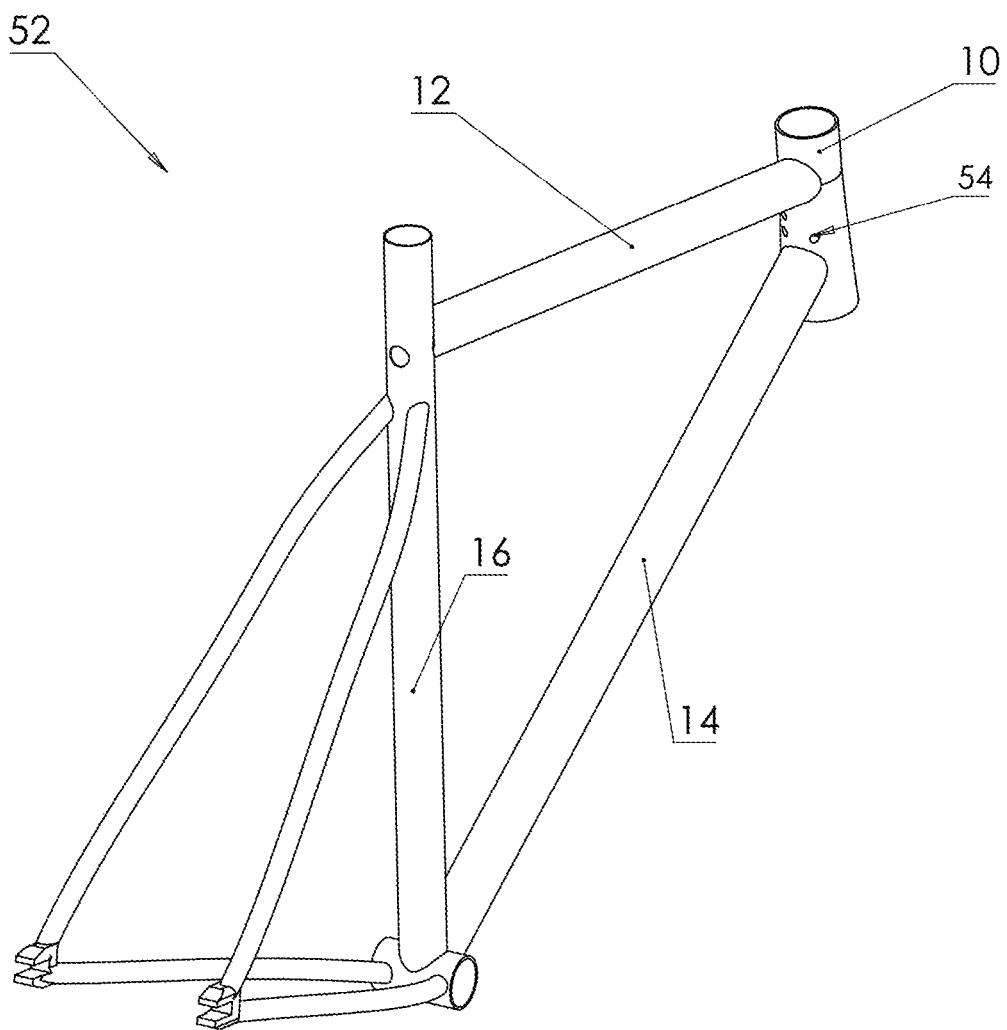
FIG. 7 shows a perspective right view of the electric bicycle frame of FIG. 1.

The bicycle frame (52) shown in FIGS. 3, 4, 5 and 7 includes: a down tube (14), a seat tube (16), a top tube (12), a head tube (10), two chain stay tubes and two seat stay tubes. As is shown in FIG. 4, four holes (58 28 60 30) are made to the head tube in order to insert the battery pack and wires inside the top tube (12) and down tube (14). The outer contours of the upper holes (58 28) are defined by intersections between a virtual extension of the inner cylindrical surface of the upper tube with wall portions of the head tube. The outer contours of the lower holes (30 60) correspond to intersections between a virtual extension of the inner cylindrical surface of the down tube with wall portions of the head tube.

As is shown in FIG. 3, smaller diameter holes (54) are also made to the head tube, these holes are made as an exit of wiring and connectors (24) which connect the control box (18) to the electronic handlebar controls on the electric bike. These electronic handlebar controls are usually but not exclusively brake sensors, accelerators, displays, lights or sound emitting devices.

As is also shown in FIG. 3, the seat tube has two holes (62 64) which are used to connect the battery pack (32 34 36) and electrical wiring (44 46) to the control box (18). The bottom bracket tube has a hole (56), seen in FIG. 5, which allows for the control box (18) to connect via electrical wiring (26 46) to electronic components fitted on the electric bicycle pedal and/or bottom bracket usually pedal rotation sensors and torque sensors. The bottom bracket also has another hole directly opposite hole (56) in order to allow the wiring (46) and the connector wiring (26) to be guided to the hole (56).

Reinforcement to the head (10) and seat tube (16) are preferably provided so as to ensure that the structural integrity of the bicycle frame is not compromised when holes (58 28 60 30 62 64) are made on the frame. In the preferable design of frame (52) shown in FIG. 7, the seat tube (16) has a thicker wall in the region of hole (62) and hole (64) (see FIG. 3) as reinforcement. In this design the seat tube wall is 1.6 mm thick such that the holes made do not compromise the structural integrity of the seat tube, but different thicknesses can be used. Furthermore the head tube (10) preferably has a 2 mm thick wall throughout the tube such that the holes made do not compromise the structural integrity of the head tube, and different thicknesses can be used.

The construction of the metal frame is usually done by cutting and shaping the different tubes and then welding them together as the traditional process. However, the invention is not limited to this process.

In traditional metal bicycle frame building certain holes are always present on the different frame tubes. These holes are made before the tubes are welded together and are used for the cataphoresis treatment of the bicycle frame. This treatment is used to protect the steel frame from corrosion and the holes aforementioned are used so that the paint can enter the inside of the tubes. This allows the protective layer of paint to be applied to the entire steel surface of the frame. These holes are present in the bicycle frame on the head tube, seat tube and bottom bracket tube.

All holes in the bicycle frame presented (52) are concealed once the battery pack (62) and wiring (64) are inserted inside the frame. This is done by either welding metal strips over the holes or by fixing a plaque over them with screws or rivets. In the present embodiment, the battery pack (62) for this electric bicycle is comprised of three parts (32 34 36) which are located in the top (12), down (14) and seat tube (16) of the frame and connected via electrical wiring (42 44 46). The assembling of battery pack (32), battery pack (34) and battery pack (36) is done individually before inserting them inside the frame. The complete battery pack (62) has a total of 24 lithium iron phosphate rechargeable cells, twelve cells in series and two stacks in parallel. This type of rechargeable battery cell chemistry has a long lifecycle and can be recharged approximately 2000 times before the charge retention qualities start to deteriorate. For the purpose of minimising battery waste and creating a more sustainable long lasting product the battery pack uses cells with lithium iron phosphate chemistry. The battery pack (32 34 36) connects to the control box (18) via electrical wiring (38) and is completely concealed inside the bicycle frame; it is protected by various layers of protective plastics and inserted inside the frame tubes. The metal bicycle frame (52) has two functions; it serves as a bicycle frame and as the ultimate layer of protection of the battery pack.

Figure 8:
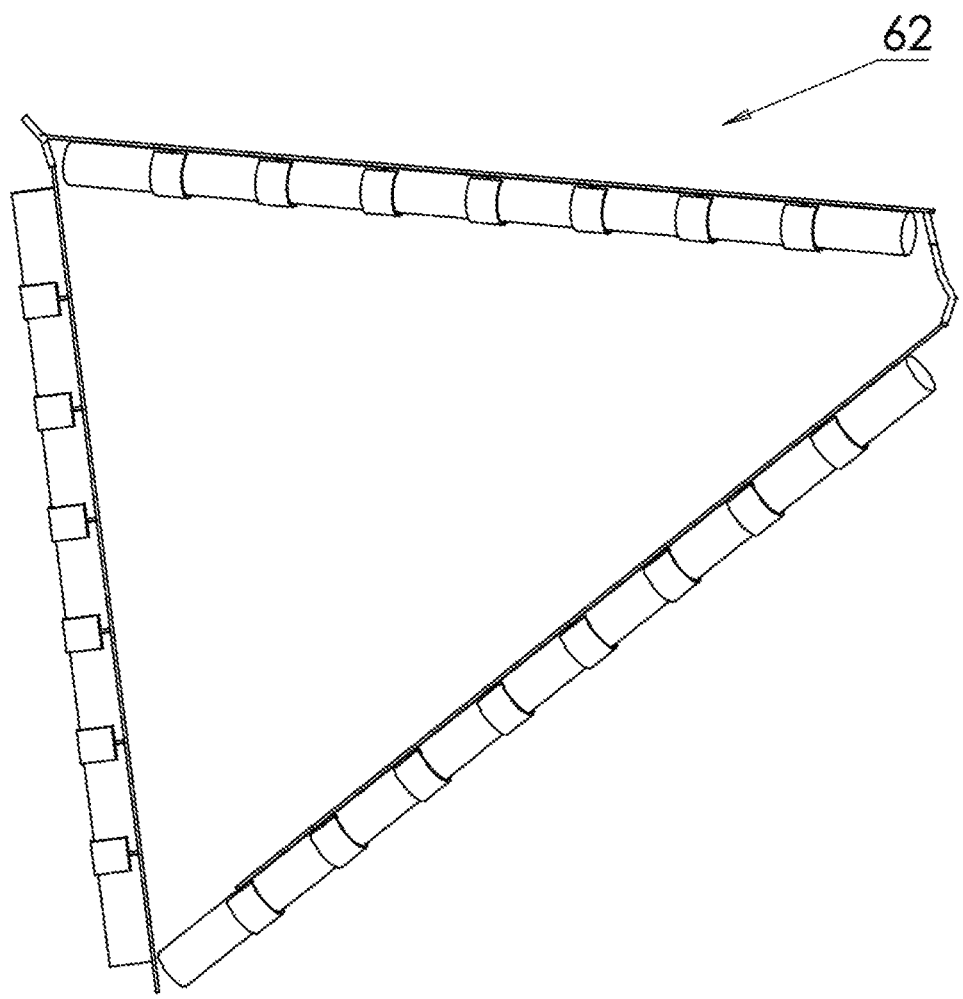
FIG. 8 shows a side view of the triangle shaped battery pack of FIG. 2 without electric components and electrical wiring.
Figure 9:
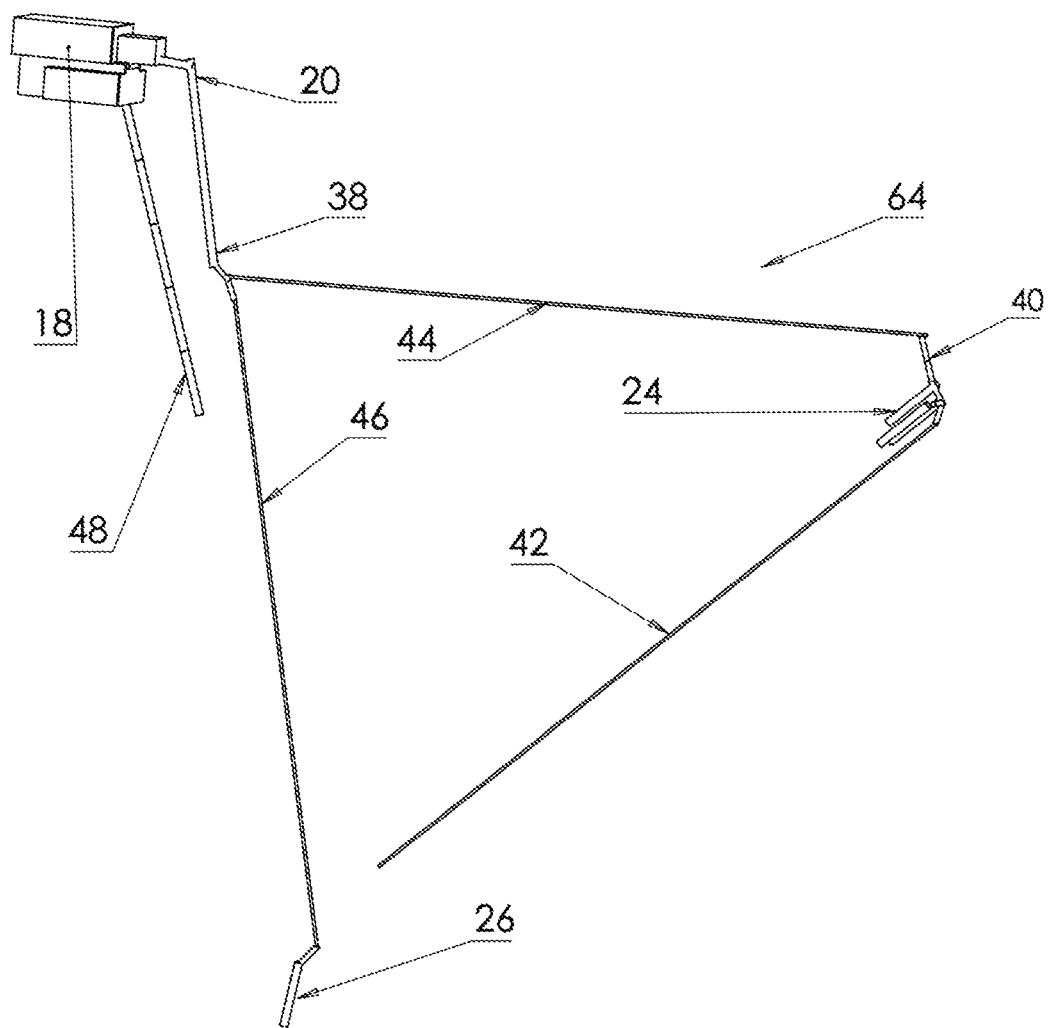
FIG. 9 shows a side view of the electronic wiring and electronic components compartment of FIG. 2.

For the battery pack presented in FIG. 8, the battery cells used are cylindrical with a diameter of 26 mm and height of 65 mm. In the complete battery pack (62) shown in FIG. 8, 24 cells are used. Battery pack (36) has 7 cells, battery pack (34) has 9 cells and battery pack (32) has 8 cells. Depending on the battery cell type, voltage and amp hours required from the battery pack; different number of battery cells can be used to build the battery pack. Battery cells that form the battery pack are connected in series and parallel via connectors and wiring. For protection and safety the battery packs are wrapped in heat shrinking plastic protective wrap before they are inserted in the frame tubes.

Once the battery packs are inserted inside the tubes, they are fixed in order to prevent movement or vibrations, this can be done with adhesives or mechanically.

The control box (18) for the electric bicycle according to the embodiment contains the following electronic components; battery management system, electric motor controller and magnetic battery recharge connector. The components inside the control box (18) connect to the handle bar controls via wiring (38 44 40 24), to bottom bracket sensors via wiring (38 46 26) and the battery pack via wiring (38). The control box connects to the electric motor via wiring (48).

All wiring connecting the control box to the various components on the electric bicycles can be easily disconnected as the wire connectors (20 48) are electrical connectors, preferable waterproof quick release electrical connectors. If the control box (18) needs to be replaced or upgraded it can be easily disconnected and detached from the seat post (70) and replaced with a new or upgraded control box. As the lifetime of the battery pack inside the frame can be of approximately 10 years it is foreseen that the control box (18) and other electronic components attached to the frame will be upgraded with new models and designs as technology advances. The new control box and electronic components will still be able to interconnect with battery and wiring inside the frame thus creating the modular electric bicycle. This modular system enables users to easily upgrade modules on their electric bike without having to purchase a complete new electric bike but only having to purchase the module they desire to upgrade.

Future control box modules might have new features such as GPS tracking, Bluetooth connections, new sensors and more; thus if the user wishes to upgrade his electric bike he needs to only purchase a new control box module and replace it with the redundant one.

This same concept is applied to all other electronic components on the electric bike such as the electric motor, sensors and controls as they are all connected to the frame via wirings that have quick release waterproof connectors.

Figure 2:
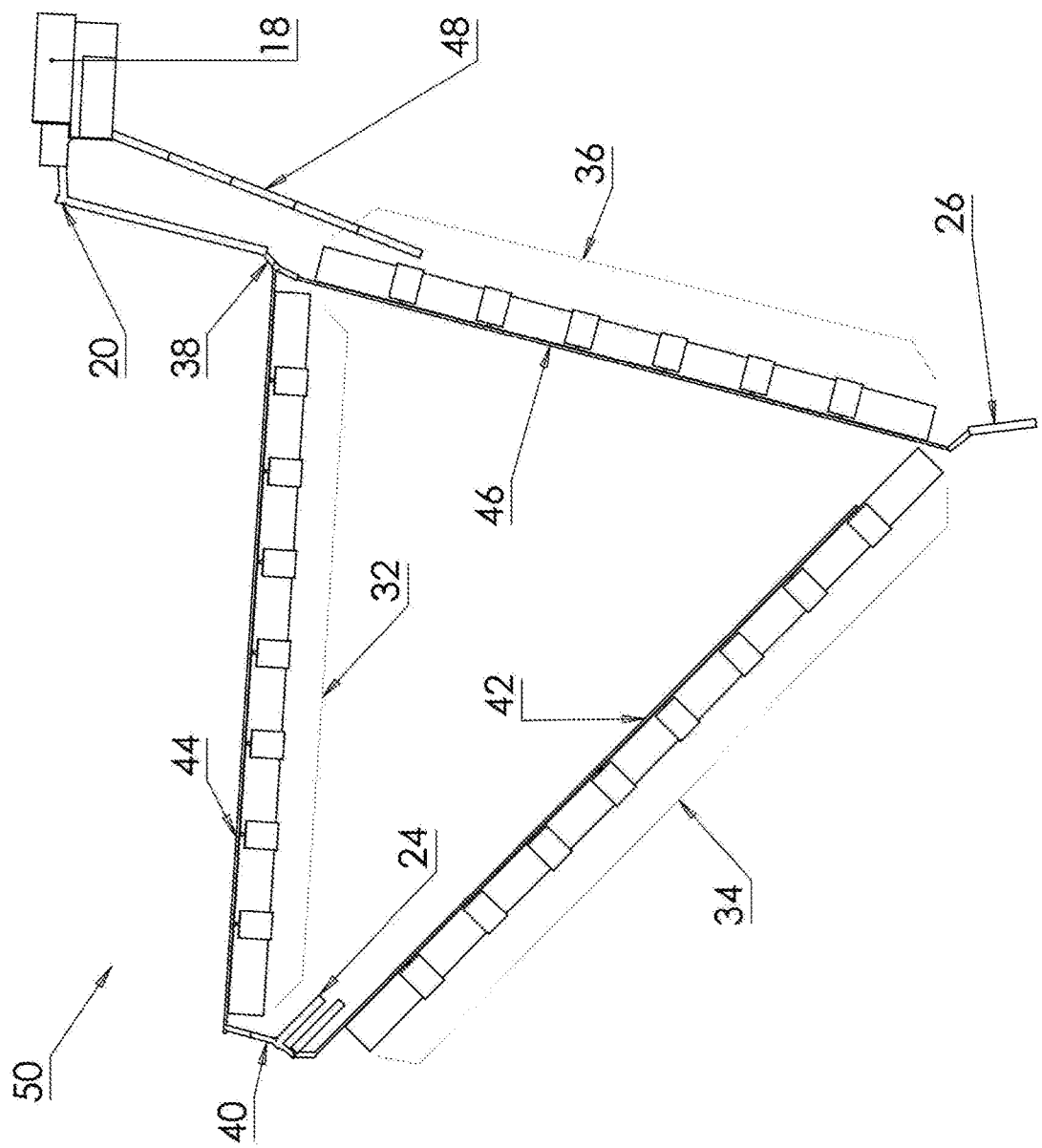
FIG. 2 shows a side view of the electronic components, battery pack and electrical wiring to be provided inside the bicycle frame shown in FIG. 1.

The wiring (24 26 48 20) seen in FIGS. 1 and 2 that connect to the various electric components are all quick release waterproof connectors. Electrical wiring (24) exiting from the head tube has quick release waterproof electrical connectors at the extremities and are designed to connect to electronic components which are present on front part of the bicycle to the control box (18). Examples include brake sensors, throttle accelerator, display, front lights, sound emitting device amongst other possible electronic devices which will become available with advances in technologies. Wiring (26) exiting from the bottom bracket tube has a waterproof quick release electrical connector at the extremity, designed to connect electronic components present on the bottom part of the bicycle to the control box (18).

Examples include pedal sensors and torque sensors used to measure the electric motor assistance needed by the user. Wiring (48) exiting from the bottom of the control box (18) has a waterproof electrical connector at the extremity used to connect the control box (18) to electronic components in the rear part of the bicycle. Examples include tail lights, sound emitting devices and rear electric hub motor. Wiring (20) exiting the top of the control box (18) is also a waterproof electrical connector used to connect the control box (18) to the other electronic modules of the electric bicycle. The use of quick release waterproof connectors also allows users to easily disconnect the different electronic modules. The object of the modular electric bike design is to encourage new development of electronic components fitted on the electric bicycle without having to switch the entire bicycle, battery pack and components. The use of a long lifecycle rechargeable battery, frame and modular electronic components; prevents waste of resources, allows technology upgrade and eases maintenance. The modular electric bike which is a product designed to last, ease of repair and use resources more efficiently; sustainability and product lifecycle has been considered in this modular electric bike design process.

The control box (18) is attached to the bicycle seat post (70) and is designed to be easily attached and removed from the seat post. The control box connects to the bicycle frame via wiring (38) which accesses the bicycle frame through a modified seat post (70).

This modified seat post has a hole (66) which allows wiring (38) to connect to the control box (18) via a quick release connector (20). Connector (20) allows users to remove the control box module and replace with new models, for convenience the connector is shown to be between saddle and seat post however this can also be further down inside the seat post or seat tube. The method that the control box (18) is attached to the seat post is currently done mechanically with screws but this can be done in other ways such as with straps. It can be seen from FIG. 1 that the control box is located underneath the bicycle saddle.

The present inventions are not limited to the classic diamond bicycle frame design presented (52) but can apply to different frame designs such as bicycle frames which have lower top tubes, mountain bikes and others such as folding bicycle frames. In the case of different frame shapes, the battery pack and wiring would be redesigned to be inserted inside the frame. Modular and quick release connectors would still allow for exchangeable components as has been presented in the invention (22).

ADVANTAGEOUS EFFECTS

Industrial Applicability

The industrial applicability of the electric bicycle frame is to assemble the frame with an electric motor, electric motor controller, sensors, commands along with the regular bicycle components such as wheels, brakes, handlebars chains etc. and to have a complete electric bicycle.

The bicycle frame according to the present invention can be used as a power storage device for many electronic components that can be added to the bicycle frame. Outdated electronic components can be easily added or changed to the electric bicycle, it is also possible to use the battery pack to charge other electric devices such as mobile phones.

The bicycle frame can also be used as the frame of a non-electric conventional bicycle as it is possible to remove the battery pack and use it as a conventional bike with regular bicycle components.

The electric bicycle frame according to the invention has preferably no d-c rechargeable battery pack or other type of battery pack being mounted to the exterior of the bicycle frame, but this can be added for extra range.

The present invention has been designed to consider and improve the aesthetics, sustainability and marketability of the electric bicycle product. This product can aid in the decarbonisation of urban travel and increase the health of urban dwellers. It can also be designed to interface with mobile devices and smartphones, this has been done in order to share data and have a mobile application with which the user can track, interface and monitor the use of his and other cyclists.

The invention claimed is:

1. A modular electric bicycle comprising:
   an electric bicycle frame having a down tube, a seat tube, a top tube, and a head tube, wherein at least one of the head tube and seat tube is modified with holes that are adapted to allow fitting of a battery pack to the inside of at least one of the top tube and down tube when all tubes are joined, wherein the electric bicycle frame further comprises:
   an electrical wiring system inside the bicycle frame wherein the electrical wiring system is adapted to be connected to the battery pack as well as to electronic components wherein the electric wiring system comprises electrical connector parts adapted to connect the electrical wiring system to electrical connector counterparts of the battery pack and the electronic components;
   an electronic component compartment which is fitted underneath a bicycle saddle and comprises an electric motor controller, the electric motor controller comprising an electrical connector counterpart adapted to be connectable to the electrical connector part of the electrical wiring system; and
   the battery pack comprised of a d-c rechargeable battery pack constructed and arranged triangularly and fit inside the top tube, the down tube and the seat tube of the electric bicycle frame, wherein the battery pack uses cells with lithium iron phosphate chemistry and further comprises the electrical connector counterpart adapted to be connectable to the electrical connector part of the electrical wiring system, wherein the modular electric bicycle is configured to allow the battery pack and the electronic components to be replaced by a user.

2. The electric bicycle frame according to claim 1, wherein outer contours of the holes correspond to intersections between a virtual extension of an inner cylindrical surface of an upper tube with wall portions of the head tube the seat tube, or outer contours of the holes correspond to intersections between a virtual extension of the inner cylindrical surface of the down tube with wall portions of the head tube.

3. The electric bicycle frame according to claim 1, wherein the electrical connectors are waterproof quick connectors.

4. The electric bicycle frame according to claim 1, wherein the head tube or the seat tube has a thicker wall in the region of the extrusion as the reinforcement.

* * * * *